(12) United States Patent
Lee

(10) Patent No.: US 10,788,096 B2
(45) Date of Patent: Sep. 29, 2020

(54) APPARATUS AND METHOD FOR FIXING STICKING DAMPER CLUTCH

(71) Applicant: HYUNDAI AUTRON CO., LTD., Seongnam-si (KR)

(72) Inventor: Hyeong-tak Lee, Seoul (KR)

(73) Assignee: Hyundai Autron Co., Ltd., Seoul (KR)

( * ) Notice: Subject to any disclaimer, the term of this patent is extended or adjusted under 35 U.S.C. 154(b) by 184 days.

(21) Appl. No.: 16/100,197

(22) Filed: Aug. 9, 2018

(65) Prior Publication Data

US 2019/0048969 A1 Feb. 14, 2019

(30) Foreign Application Priority Data

Aug. 11, 2017 (KR) .................. 10-2017-0102306

(51) Int. Cl.
| | | |
|---|---|---|
| *F16H 61/12* | (2010.01) | |
| *F16F 15/12* | (2006.01) | |
| *F16H 61/14* | (2006.01) | |
| *F16H 59/46* | (2006.01) | |

(52) U.S. Cl.
CPC ......... *F16F 15/1203* (2013.01); *F16H 61/12* (2013.01); *F16H 61/143* (2013.01); *F16H 61/148* (2013.01); *F16D 2500/1085* (2013.01); *F16D 2500/10412* (2013.01); *F16D 2500/3024* (2013.01); *F16F 2230/24* (2013.01); *F16H 2059/467* (2013.01); *F16H 2061/1208* (2013.01); *F16H 2061/128* (2013.01); *F16H 2061/1228* (2013.01); *F16H 2061/1276* (2013.01)

(58) Field of Classification Search
CPC .. F16H 61/12; F16H 61/143; F16H 2059/467; F16H 2061/1208; F16H 2061/1228; F16H 2061/1276; F16H 2061/128; F16D 48/06
See application file for complete search history.

(56) References Cited

U.S. PATENT DOCUMENTS

| | | | | |
|---|---|---|---|---|
| 5,598,334 A | * | 1/1997 | Shin ........................ | F16H 61/12 |
| | | | | 701/51 |
| 5,921,887 A | * | 7/1999 | Zhang ...................... | F16H 41/30 |
| | | | | 477/127 |

(Continued)

FOREIGN PATENT DOCUMENTS

| | | |
|---|---|---|
| CN | 101446346 A | 6/2009 |
| CN | 102278461 A | 12/2011 |
| CN | 104471218 A | 3/2015 |

(Continued)

OTHER PUBLICATIONS

Office Action, Chinese Patent Application No. 201810895407.3, Chinese Intellectual Property Office, dated Dec. 4, 2019, China.

*Primary Examiner* — Edwin A Young

(74) *Attorney, Agent, or Firm* — Baker & Hostetler LLP; Hyunho Park

(57) ABSTRACT

An apparatus for fixing a sticking damper clutch may include: a transmission controller configured to determine whether a damper clutch sticks, using engine controller information received from an engine controller and damper clutch status information of the damper clutch; and a hydraulic pressure controller configured to fix the sticking damper clutch according to the determination result of the transmission controller.

16 Claims, 6 Drawing Sheets

(56) References Cited

U.S. PATENT DOCUMENTS

2002/0037789 A1* 3/2002 Yeo .................... F16H 61/0437
477/64
2004/0186645 A1 9/2004 Kohno et al.

FOREIGN PATENT DOCUMENTS

| | | |
|---|---|---|
| JP | 11-280896 A | 10/1999 |
| KR | 10-1998-0060028 A | 10/1998 |
| KR | 10-2003-0065754 A | 8/2003 |
| KR | 10-0435638 B1 | 6/2004 |
| KR | 10-2006-0060357 A | 6/2006 |
| KR | 10-2007-0027090 A | 3/2007 |
| KR | 10-2008-0051419 A | 6/2008 |
| KR | 10-2010-0061170 A | 6/2010 |
| KR | 10-2013-0029145 A | 3/2013 |
| KR | 10-2015-0139655 A | 12/2015 |
| KR | 10-2016-0062292 A | 6/2016 |

* cited by examiner

(12) United States Patent

APPARATUS AND METHOD FOR FIXING STICKING DAMPER CLUTCH

CROSS-REFERENCES TO RELATED APPLICATIONS

The present application claims priority to Korean application number 10-2017-0102306, filed on Aug. 11, 2017, which is incorporated by reference in its entirety.

BACKGROUND OF THE INVENTION

The present invention relates to an apparatus and method for fixing a sticking damper clutch, and more particularly, to an apparatus and method for fixing a sticking damper clutch, which can determine whether a damper clutch within a torque converter for transferring a driving force of an engine sticks, and fix the sticking damper clutch according to the determination result.

An automatic transmission includes a gear shifting control device which controls hydraulic pressure by driving a plurality of solenoid valves according to the velocity of a vehicle, the opening degree of a throttle valve and overall detection conditions, such that a plurality of operating elements are operated to automatically shift gears to a target speed stage.

In order to supply hydraulic pressure to the plurality of operating elements, the gear shifting control device forms line pressure and control pressure. The line pressure indicates pressure supplied to a solenoid valve which forms the control pressure while transmission oil stored in an oil pan is pressurized by an operation of an oil pump.

As the automatic transmission, a system capable of variably controlling the line pressure has been developed and applied. That is, the existing automatic transmission includes a solenoid valve for varying the line pressure between the oil pump for pressurizing oil and the solenoid valve for forming the control pressure. When the oil pressurized by the oil pump is supplied as primary line pressure to the solenoid valve, the solenoid valve varies the line pressure according to a control signal which is applied from the gear shifting control device, depending on a condition such as the current speed stage or the overall operation information of the vehicle.

As such, the line pressure supplied to the solenoid valve for forming the control pressure is freely controlled to lower the line pressure depending on situations. Therefore, the load of a torque converter can be reduced to thereby improve fuel efficiency.

The related art of the present invention is closed in Korean Patent Publication No. 10-2016-0062292 published on Jun. 2, 2016 and entitled "Apparatus and method for controlling dual clutch transmission".

The automatic transmission includes the torque converter for transferring a driving force of an engine controlled by an engine controller. The torque converter includes a damper clutch to selectively engage and disengage various friction elements of the automatic transmission such as a clutch, brake and servo, depending on a gear position.

The damper clutch directly connects a fluid clutch in the torque converter of the automatic transmission to a flywheel, thereby removing a power loss caused by hydraulic pressure.

In the conventional torque converter, however, a slip may occur due to non-working of the damper clutch in a low velocity region or low stage region. The slip of the damper clutch increases the temperature of oil in the torque converter or the temperature of the clutch. The increase of the oil temperature or the clutch temperature causes the damper clutch to stick.

When the sticking of the damper clutch progresses, an engine stop and degradation in launch feel of the vehicle may occur. Therefore, the sticking damper clutch must be diagnosed and fixed at the initial stage.

BRIEF SUMMARY

Various embodiments of the present invention are directed to an apparatus and method for fixing a sticking damper clutch, which can determine whether a damper clutch within a torque converter sticks, based on information of an engine controller and a damper clutch status, and fix the sticking damper clutch by controlling a solenoid valve according to the determination result.

Also, various embodiments of the present invention are directed to an apparatus and method for fixing a sticking damper clutch, which can prevent an engine stop caused by a sticking damper clutch by fixing the sticking damper clutch within a torque converter, thereby inducing a vehicle to normally drive.

Also, various embodiments of the present invention are directed to an apparatus and method for fixing a sticking damper clutch, which can prevent a reduction in launch feel, caused by the sticking damper clutch, by fixing the sticking damper clutch within a torque converter, thereby increasing a passenger's satisfaction.

Also, various embodiments of the present invention are directed to an apparatus and method for fixing a sticking damper clutch, which can determine whether a damper clutch within a torque converter sticks, based on information of an engine controller and a damper clutch status, without a separate device or equipment, thereby minimizing the number of parts and the cost which are required for determining whether the damper clutch sticks.

In one embodiment, an apparatus for fixing a sticking damper clutch may include: a transmission controller configured to determine whether a damper clutch sticks, using engine controller information received from an engine controller and damper clutch status information of the damper clutch; and a hydraulic pressure controller configured to fix the sticking damper clutch according to the determination result of the transmission controller.

The transmission controller may include: a sticking occurrence environment condition determination unit configured to determine whether a preset sticking occurrence environment condition is satisfied, using gear shifting information or vehicle velocity sensed by a vehicle velocity sensor; and a sticking determination unit configured to determine whether the damper clutch sticks, when the determination result of the sticking occurrence environment condition determination unit indicates that the sticking occurrence environment condition is satisfied.

When the gear shifting information indicates that gear shifting is not being performed or a speed stage is equal to or lower than a preset speed stage, or the vehicle velocity sensed by the vehicle velocity sensor is equal to or less than a preset vehicle velocity, the sticking occurrence environment condition determination unit may determine that the sticking occurrence environment condition is satisfied.

The sticking determination unit may determine whether the damper clutch sticks, based on one or more of an oil temperature, information on whether the damper clutch operates, a slip amount of the damper clutch, an accelerator pedal amount, and an engine RPM.

The sticking determination unit may determine whether the damper clutch sticks, based on whether the oil temperature falls within a preset oil temperature range, whether the damper clutch does not operate, whether the slip amount of the damper clutch is equal to or less than a preset threshold slip amount, whether the accelerator pedal amount is equal to or less than a preset threshold accelerator pedal amount, and whether the state in which a difference between an actual engine RPM and a target engine RPM calculated through information on whether an air conditioner is operated or the pressure of air flowing into the engine is equal to or more than a preset threshold engine RPM is maintained for a preset threshold time or more.

When the determination result of the sticking determination unit indicates that the damper clutch sticks, the hydraulic pressure controller may fix the sticking damper clutch by controlling hydraulic pressure of a solenoid valve.

The hydraulic pressure controller may repeat a process of engaging and disengaging the solenoid valve at a preset duty by a preset number of times.

In another embodiment, a method for fixing a sticking damper clutch may include: determining, by a transmission controller, whether a preset sticking occurrence environment condition is satisfied, based on gear shifting information and vehicle velocity sensed by a vehicle sensor; determining, by the transmission controller, whether a damper clutch sticks, depending on whether the sticking occurrence environment condition is satisfied; and fixing, by a hydraulic pressure controller, the sticking damper clutch according to the determination result of the transmission controller.

In the determining of whether the sticking occurrence environment condition is satisfied, the transmission controller may determine that the sticking occurrence environment condition is satisfied, when the gear shifting information indicates that gear shifting is not being performed or a speed stage is equal to or lower than a preset speed stage, or the vehicle velocity sensed by the vehicle velocity sensor is equal to or less than a preset vehicle velocity.

In the determining of whether the damper clutch sticks, the transmission controller may determine whether the damper clutch sticks, based on one or more of an oil temperature, information on whether the damper clutch operates, a slip amount of the damper clutch, an accelerator pedal amount, and an engine RPM.

In determining of whether the damper clutch sticks, the transmission controller may determine whether the damper clutch sticks, based on whether the oil temperature falls within a preset oil temperature range, whether the damper clutch does not operate, whether the slip amount of the damper clutch is equal to or less than a preset threshold slip amount, whether the accelerator pedal amount is equal to or less than a preset threshold accelerator pedal amount, and whether the state in which a difference between an actual engine RPM and a target engine RPM calculated through information on whether an air conditioner is operated or the pressure of air flowing into the engine is equal to or more than a preset threshold engine RPM is maintained for a preset threshold time or more.

In the fixing of the sticking damper clutch, the hydraulic pressure controller may fix the sticking damper clutch by controlling hydraulic pressure of a solenoid valve according to the determination result of the sticking determination unit.

In the fixing of the sticking damper clutch, the hydraulic pressure controller may repeat a process of engaging and disengaging the solenoid valve at a preset duty by a preset number of times.

In another embodiment, a method for fixing a sticking damper clutch may include: determining, by a transmission controller, whether oil temperature falls within a preset oil temperature range; determining, by the transmission controller, whether a damper clutch operates, when the oil temperature falls within the oil temperature range; determining, by the transmission controller, whether a slip amount of the damper clutch is equal to or less than a preset threshold slip amount, when the damper clutch does not operate; determining, by the transmission controller, whether an accelerator pedal amount is equal to or more than a preset threshold accelerator pedal amount, when the slip amount of the damper clutch is equal to or less than the threshold slip amount; determining, by the transmission controller, whether the state in which a difference between an actual engine RPM and a target engine RPM calculated through information on whether an air conditioner is operated or the pressure of air flowing into the engine is equal to or more than a preset threshold engine RPM is maintained for a preset threshold time or more, when the accelerator pedal amount is equal to or less than the threshold accelerator pedal amount; and determining, by the transmission controller, that the damper clutch sticks, when the state in which the difference between the actual engine RPM and the target engine RPM calculated through the information on whether the air conditioner is operated or the pressure of air flowing into the engine is equal to or more than the threshold engine RPM is maintained for the threshold time or more.

The method may further include determining, by the transmission controller, whether a preset sticking occurrence environment condition is satisfied, based on gear shifting information or vehicle velocity sensed by a vehicle velocity sensor.

In the determining of whether the sticking occurrence environment condition is satisfied, the transmission controller may determine that the sticking occurrence environment condition is satisfied, when the gear shifting information indicates that gear shifting is not being performed or a speed stage is equal to or lower than a preset speed stage, or the vehicle velocity sensed by the vehicle velocity sensor is equal to or less than a preset vehicle velocity.

DETAILED DESCRIPTION

Hereafter, an apparatus and method for fixing a sticking damper clutch in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
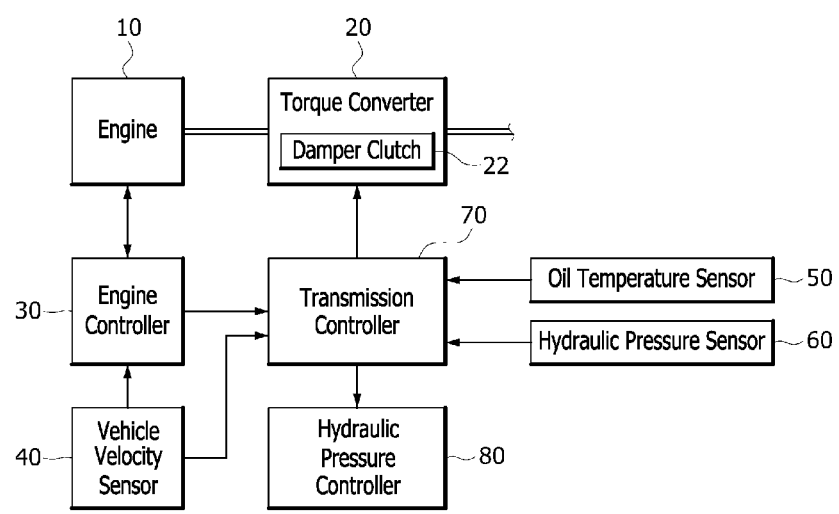
FIG. 1 is a block diagram illustrating an apparatus for fixing a sticking damper clutch in accordance with an embodiment of the present invention.
Figure 2:
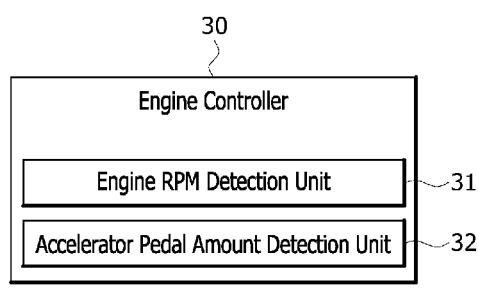
FIG. 2 is a block diagram illustrating an engine controller in accordance with the embodiment of the present invention.
Figure 3:
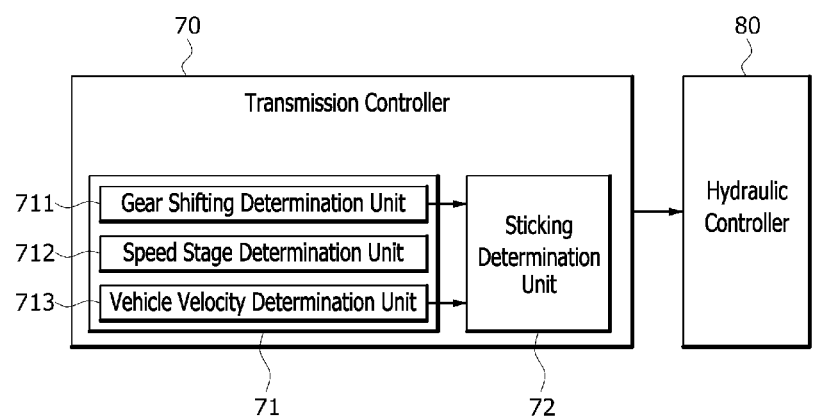
FIG. 3 is a block diagram illustrating a transmission controller in accordance with the embodiment of the present invention.

FIG. 1 is a block diagram illustrating an apparatus for fixing a sticking damper clutch in accordance with an embodiment of the present invention, FIG. 2 is a block diagram illustrating an engine controller in accordance with the embodiment of the present invention, and FIG. 3 is a block diagram illustrating a transmission controller in accordance with the embodiment of the present invention.

Referring to FIG. 1, the apparatus for fixing a sticking damper clutch in accordance with the embodiment of the present invention may include an engine 10, a torque converter 20, an engine controller 30, a transmission controller 70 and a hydraulic pressure controller 80.

The torque converter 20 may include a damper clutch 22 to selectively engage and disengage various friction elements of an automatic transmission, such as a clutch, brake (not illustrated), and servo (not illustrated), depending on a gear position.

The damper clutch 22 may directly connect a fluid clutch in the torque converter 20 in the automatic transmission to a flywheel (not illustrated), thereby removing a power loss caused by hydraulic pressure.

The torque converter 20 may cause a slip by not operating the damper clutch 22 in a low-velocity region or low-stage region, and launch or stop the vehicle through the slip.

When the slip occurs in the damper clutch 22, the damper clutch 22 may stick. Thus, when the sticking of the damper clutch 22 progresses, the engine 10 may be stopped or a launch feel of the vehicle may be degraded.

Therefore, the transmission controller 70 may determine whether the damper clutch 22 within the torque converter 20 sticks, based on the information of the engine controller 30 and the damper clutch status, and remove the sticking of the damper clutch 22 by controlling a solenoid valve (not illustrated) according to the determination result. The method for determining and removing the sticking of the damper clutch 22 through the transmission controller 70 will be described later.

A vehicle velocity sensor 40 may sense vehicle velocity.

The engine controller 30 may be connected to an accelerator pedal sensor (not illustrated) or the vehicle velocity sensor 40 and the engine 10, and control overall operations of the engine 10 such as torque control of the engine 10, according to an accelerator pedal amount transferred from the accelerator pedal sensor, the vehicle velocity or the rotational velocity of the engine 10.

That is, the engine controller 30 may be connected to the accelerator pedal sensor or the vehicle velocity sensor 40 and the engine 10, and control an engine RPM and engine torque by controlling a fuel injection amount or the opening degree of a throttle valve (not illustrated) according to the accelerator pedal amount transferred from the accelerator pedal sensor, the vehicle velocity or the rotational velocity of the engine.

In particular, the engine controller 30 may transfer a target engine RPM and a current engine RPM to the transmission controller 70, the target engine RMP being calculated through the accelerator pedal amount sensed by the accelerator pedal sensor and information on whether an air conditioner is operated or the pressure of air flowing into the engine.

Referring to FIG. 2, the engine controller 30 may include an engine RPM detection unit 31 and an accelerator pedal amount detection unit 32.

The engine RPM detection unit 31 may calculate the target engine RPM through the information on whether the air conditioner is operated or the pressure of air flowing into the engine, detect the current engine RPM, and input the target engine RPM and the current engine RPM to the transmission controller 70.

The current engine RPM and the target engine RPM calculated through the information on whether the air conditioner is operated or the pressure of air flowing into the engine may be inputted to the transmission controller 70, and used for determining whether the damper clutch 22 sticks.

The accelerator pedal amount detection unit 32 may be connected to the accelerator pedal sensor, detect an accelerator pedal amount depending on a driver's acceleration intention, and input the detected accelerator pedal amount to the transmission controller 70.

The accelerator pedal amount detected by the accelerator pedal amount detection unit 32 may be used when the transmission controller 70 determines whether the damper clutch 22 sticks.

The method for determining whether the damper clutch 22 sticks, based on the accelerator pedal amount, the current engine RPM and the target engine RPM calculated through the information on whether the air conditioner is operated or the pressure of air flowing into the engine, will be described later.

The oil temperature sensor 50 may be installed in the automatic transmission, sense the temperature of oil within the automatic transmission, and input the sensed oil temperature to the transmission controller 70.

Typically, when the temperature of the oil within the automatic transmission falls within a preset oil temperature range of 30° C. to 120° C., for example, the damper clutch 22 may stick. The information on whether the oil temperature sensed by the oil temperature sensor 50 falls within the preset oil temperature range may be used as a reference value for determining whether the damper clutch 22 sticks.

The hydraulic pressure sensor 60 may be connected to a hydraulic pressure tap (not illustrated) formed in the automatic transmission, and sense hydraulic pressure introduced into a plurality of solenoid valves (not illustrated) for controlling gear shifting of the automatic transmission.

The transmission controller 70 may determine whether a sticking occurrence environment condition is satisfied, based on the engine controller information transferred from the engine controller 30 and the damper clutch status information of the damper clutch 22. When the determination result indicates that the sticking occurrence environment condition is satisfied, the transmission controller 70 may determine whether the damper clutch 22 sticks.

Referring to FIG. 3, the transmission controller 70 may include a sticking occurrence environment condition determination unit 71 and a sticking determination unit 72.

The sticking occurrence environment condition determination unit 71 may determine whether the preset sticking occurrence environment condition is satisfied, based on the gear shifting information or the vehicle velocity sensed by the vehicle velocity sensor 40.

The sticking occurrence environment condition determination unit 71 may include a gear shifting determination unit 711, a speed stage determination unit 712 and a vehicle velocity determination unit 713.

The gear shifting determination unit 711 may determine whether the speed stage is being shifted, based on the engine RPM received from the engine controller 30, the vehicle velocity sensed by the vehicle velocity sensor 40, or the accelerator pedal amount. When the determination result indicates that the speed stage is not being shifted, the gear shifting determination unit 711 may determine that the sticking occurrence environment condition is satisfied.

The speed stage determination unit 712 may determine whether the current speed stage is equal to or lower than a preset speed stage, for example, the second speed. When the determination result indicates that the current speed stage is equal to or lower than the second speed, the speed stage determination unit 712 may determine that the sticking occurrence environment condition is satisfied.

The vehicle velocity determination unit 713 may determine whether the vehicle velocity sensed by the vehicle velocity sensor 40 is equal to or less than a preset vehicle velocity. When the determination result indicates that the vehicle velocity is equal to or less than the preset vehicle velocity, the vehicle velocity determination unit 713 may determine that the sticking occurrence environment condition is satisfied.

That is, the torque converter 20 in the automatic transmission may cause a slip through non-working of the damper clutch 22 in the low velocity region or the low stage region, and the slip may cause the damper clutch 22 to stick. Therefore, when the gear shifting determination unit 711 determines that the speed stage is being shifted, the speed stage determination unit 712 determines that the speed stage is equal to or lower than the preset speed stage, or the vehicle velocity determination unit 713 determines that the vehicle velocity is equal to or less than the preset vehicle velocity, the sticking occurrence environment condition determination unit 71 may determine that the damper clutch 22 is likely to stick.

When the sticking occurrence environment condition determination unit 71 determines that the sticking occurrence environment condition is satisfied, the sticking determination unit 72 may determine whether the damper clutch 22 actually sticks.

That is, when the gear shifting determination unit 711 determines that the speed stage is equal to or lower than the second speed, the speed stage determination unit 712 determines that the speed stage is equal to or lower than the preset speed stage, or the vehicle velocity determination unit 713 determines that the vehicle velocity is equal to or less than the preset vehicle velocity, the sticking determination unit 72 may determine whether the damper clutch 22 actually sticks.

More specifically, the sticking determination unit 72 may determine whether the damper clutch 22 actually sticks, based on one or more of the oil temperature sensed by the oil temperature sensor 50, the information on whether the damper clutch 22 operates, the slip amount of the damper clutch 22, the accelerator pedal amount, and the engine RPM.

First, the sticking determination unit 72 may determine whether the oil temperature sensed by the oil temperature sensor 50 falls within the preset oil temperature range.

The sticking of the damper clutch 22 may occur when the temperature of oil within the automatic transmission falls within the preset oil temperature range. Therefore, when the temperature of oil within the damper clutch 22 falls within the preset oil temperature range, the sticking determination unit 72 may determine that the damper clutch 22 is likely to stick.

The sticking determination unit 72 may determine whether the damper clutch 22 operates. That is, when determining that the damper clutch 22 does not operate, based on the hydraulic pressure sensed by the hydraulic pressure sensor 60, the sticking determination unit 72 may determine that the damper clutch 22 is likely to stick.

The sticking determination unit 72 may determine whether the slip amount of the damper clutch 22 is equal to or less than a preset threshold slip amount. When the damper clutch 22 sticks, the slip amount of the damper clutch 22 may be reduced. Therefore, when the slip amount of the damper clutch 22 is equal to or less than the threshold slip amount, the sticking determination unit 72 may determine that the damper clutch 22 is likely to stick.

The sticking determination unit 72 may determine whether the accelerator pedal amount sensed by the accelerator pedal sensor is equal to or less than a preset threshold accelerator pedal amount. The sticking of the damper clutch 22 may occur when the driver has no intention to accelerate the vehicle. Therefore, when the accelerator pedal amount is equal to or less than the threshold accelerator pedal amount, the sticking determination unit 72 may determine that the damper clutch 22 is likely to stick.

The sticking determination unit 72 may determine whether the state in which a difference between the target engine RPM transferred from the engine controller 30 and the actual engine RPM is equal to or more than a preset threshold engine RPM is maintained for a threshold time or more, the target engine RPM being calculated through the information on whether the air conditioner is operated or the pressure of air flowing into the engine. When the damper clutch 22 sticks, a large difference may occur between the actual engine RPM and the target engine RPM calculated through the information on whether the air conditioner is operated or the pressure of air flowing into the engine. Such a situation will continue.

Therefore, the sticking determination unit 72 may calculate the difference between the actual engine RPM and the target engine RPM calculated through the information on whether the air conditioner is operated or the pressure of air flowing into the engine. When the state in which the difference between the target engine RPM and the actual engine RPM is equal to or more than the threshold engine RPM is maintained for the threshold time or more, the sticking determination unit 72 may determine that the damper clutch 22 is likely to stick.

That is, when the oil temperature falls within the preset oil temperature range, the damper clutch 22 does not operate, the slip amount of the damper clutch 22 is equal to or less than the threshold slip amount, the accelerator pedal amount is equal to or less than the threshold accelerator pedal amount, and the state in which the difference between the target engine RPM and the actual engine RPM is equal to or more than the threshold engine RPM is maintained for the threshold time or more, the sticking determination unit 72 may determine that the damper clutch 22 sticks.

The hydraulic pressure controller 80 may fix the sticking damper clutch 22 by controlling the hydraulic pressure of the solenoid valve according to the determination result of the transmission controller 70.

That is, when the determination result of the sticking determination unit 72 indicates that the damper clutch 22 sticks, the hydraulic pressure controller 80 may fix the sticking damper clutch 22 by controlling the hydraulic pressure of the solenoid valve.

In this case, the hydraulic pressure controller 80 may repeatedly supply the hydraulic pressure through the solenoid valve by repeating a process of engaging and disengaging the solenoid valve at a preset duty, for example, 100% by a preset number of times, in order to fix the sticking damper clutch 22.

Hereafter, a method for fixing a sticking damper clutch in accordance with an embodiment of the present invention will be described in detail.

Figure 4:
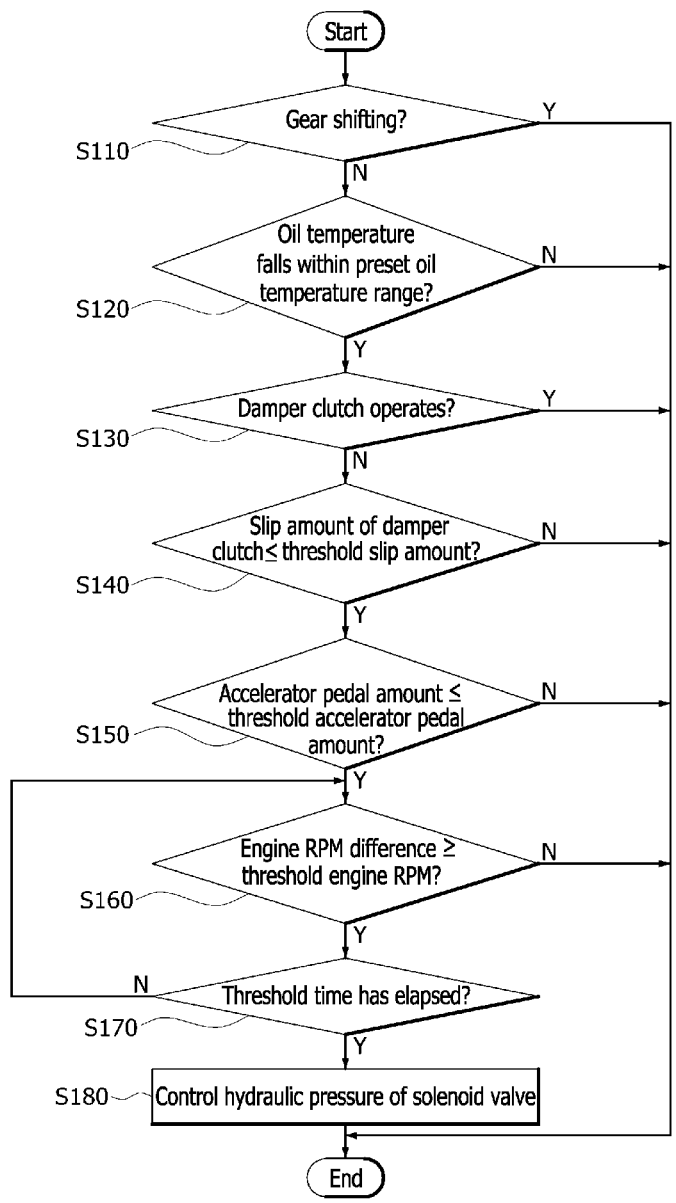
FIG. 4 is a flowchart illustrating a method for fixing a sticking damper clutch in accordance with an embodiment of the present invention.

FIG. 4 is a flowchart illustrating the method for fixing a sticking damper clutch in accordance with the embodiment of the present invention.

Referring to FIG. 4, the engine controller 30 may calculate a target engine RPM through an accelerator pedal amount of the accelerator pedal sensor depending on a driver's attention to accelerate the vehicle and information on whether the air conditioner is operated or the pressure of air flowing into the engine, detect a current engine RPM, and input the target engine RPM and the current engine RPM to the transmission controller 70.

The oil temperature sensor 50 may sense the temperature of oil within the automatic transmission, and input the sensed oil temperature to the transmission controller 70, and the hydraulic pressure sensor 60 may sense hydraulic pressures introduced into the respective solenoid valves for controlling gear shifting of the automatic transmission, and input the sensed hydraulic pressures to the transmission controller 70.

As the current engine RPM and the target engine RPM calculated through the accelerator pedal amount and the information on whether the air conditioner is operated or the pressure of air flowing into the engine are received from the engine controller 30, the transmission controller 70 may determine whether gear shifting is being performed, based on the engine RPMs or the accelerator pedal amount, at step S110.

When the determination result of step S110 indicates that gear shifting is not being performed, the transmission controller 70 may compare the oil temperature sensed by the oil temperature sensor 50 to the preset oil temperature range, and determine whether the oil temperature falls within the preset oil temperature range, at step S120.

When the determination result of step S120 indicates that the oil temperature sensed by the oil temperature sensor 50 falls within the preset oil temperature range, the transmission controller 70 may determine whether the damper clutch 22 operates, at step S130.

When the determination result of step S130 indicates that the damper clutch 22 does not operate, the transmission controller 70 may compare a slip amount of the damper clutch 22 to the threshold slip amount, and determine whether the slip amount of the damper clutch 22 is equal to or less than the threshold slip amount, at step S140.

When the determination result of step S140 indicates that the slip amount is equal to or less than the threshold slip amount, the transmission controller 70 may compare the accelerator pedal amount sensed by the accelerator pedal sensor to the threshold accelerator pedal amount, and determine whether the accelerator pedal amount is equal to or less than the threshold accelerator pedal amount, at step S150.

When the determination result of step S150 indicates that the accelerator pedal amount is equal to or less than the threshold accelerator pedal amount, the transmission controller 70 may calculate a difference between the actual engine RPM and the target engine RPM calculated through the information on whether the air conditioner is operated or the pressure of air flowing into the engine, and determine whether the state in which the difference between the actual engine RPM and the target engine RPM is equal to or more than the threshold engine RPM is maintained for a threshold time or more, at steps S160 and S170.

When the determination result of steps S160 and S170 indicates that the state in which the difference between the actual engine RPM and the target engine RPM calculated through the information on whether the air conditioner is operated or the pressure of air flowing into the engine is equal to or more than the threshold engine RPM is maintained for the threshold time or more, the transmission controller 70 may determine that the damper clutch 22 sticks.

That is, when the oil temperature falls within the preset oil temperature range, the damper clutch 22 does not operate, the slip amount of the damper clutch 22 is equal to or less than the threshold slip amount, the accelerator pedal amount is equal to or less than the threshold accelerator pedal amount, and the state in which the difference between the target engine RPM and the actual engine RPM is equal to or more than the threshold engine RPM is maintained for the threshold time or more, the transmission controller 70 may determine that the damper clutch 22 sticks.

When the transmission controller 70 determines that the damper clutch 22 sticks, the hydraulic pressure controller 80 may fix the sticking damper clutch 22 by controlling the hydraulic pressure of the solenoid valve at step S180. In this case, the hydraulic pressure controller 80 may repeatedly supply the hydraulic pressure through the solenoid valve by repeating a process of engaging and disengaging the solenoid valve at a preset duty by a preset number of times, thereby fixing the sticking damper clutch 22.

Figure 5:
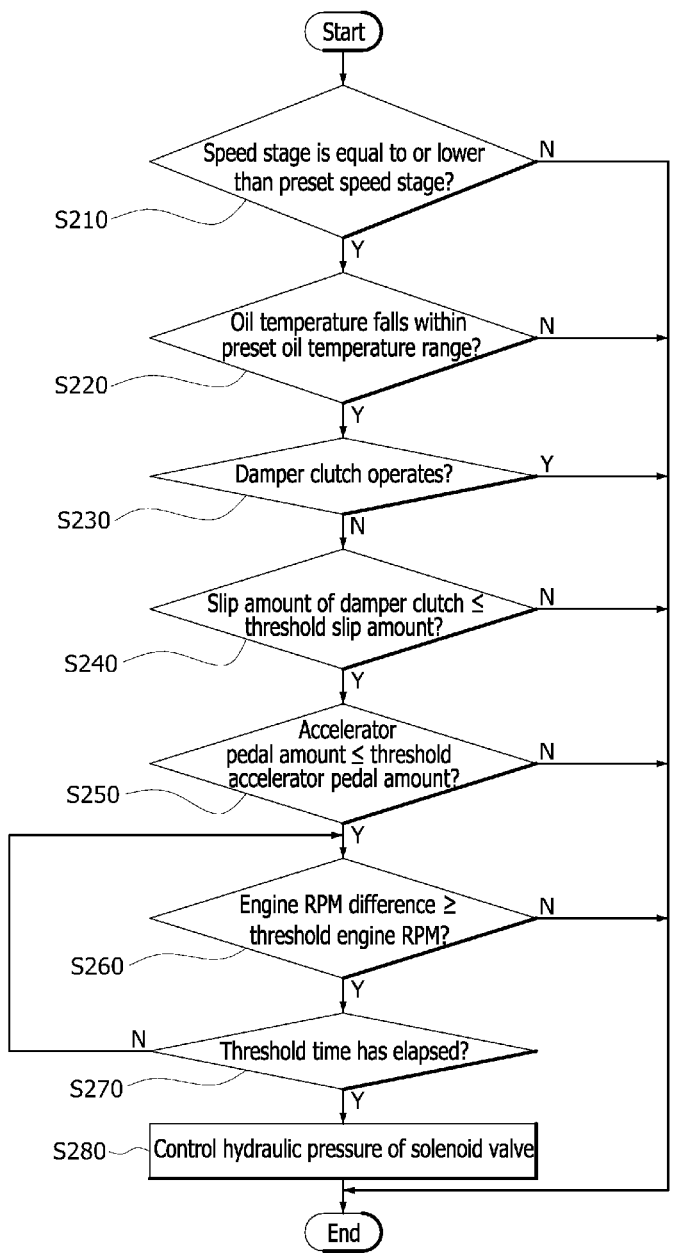
FIG. 5 is a flowchart illustrating a method for fixing a sticking damper clutch in accordance with another embodiment of the present invention.

FIG. 5 is a flowchart illustrating a method for fixing a sticking damper clutch in accordance with another embodiment of the present invention.

Referring to FIG. 5, the engine controller 30 may calculate a target engine RPM through an accelerator pedal amount of the accelerator pedal sensor depending on a driver's attention to accelerate the vehicle and information on whether the air conditioner is operated or the pressure of air flowing into the engine, detect a current engine RPM, and input the target engine RPM and the current engine RPM to the transmission controller 70.

The oil temperature sensor 50 may sense the temperature of oil within the automatic transmission, and input the sensed oil temperature to the transmission controller 70, and the hydraulic pressure sensor 60 may sense hydraulic pressures introduced into the plurality of solenoid valves for controlling gear shifting of the automatic transmission, respectively, and input the sensed hydraulic pressures to the transmission controller 70.

As a speed stage is received from the engine controller 30, the transmission controller 70 may determine whether the speed stage received from the engine controller 30 is equal to or lower than a preset speed stage, at step S210.

When the determination result of step S210 indicates that the speed stage is equal to or less than the preset speed stage, the transmission controller 70 may determine whether the damper clutch 22 sticks, based on one or more of an oil temperature sensed by the oil temperature sensor 50, information on whether the damper clutch 22 operates, a slip amount of the damper clutch 22, an accelerator pedal amount, and an engine RPM. The method in which the transmission controller 70 determines whether the damper clutch 22 sticks has been described above with reference to FIG. 4. Therefore, the detailed descriptions thereof are omitted herein.

That is, the transmission controller 70 may determine whether the oil temperature falls within a preset oil temperature range at step S220, determine whether the damper clutch 22 operates at step S230, determine whether the slip amount of the damper clutch 22 is equal to or less than a threshold slip amount at step S240, determine whether the accelerator pedal amount is equal to or less than a threshold accelerator pedal amount at step S250, and determine whether the state in which a difference between the actual engine RPM and the target engine RPM calculated through the information on whether the air conditioner is operated or the pressure of air flowing into the engine is equal to or more than a threshold engine RPM is maintained for a threshold time or more, at steps S260 and S270.

When the determination results indicate that the oil temperature falls within the preset oil temperature range, the damper clutch 22 does not operate, the slip amount of the damper clutch 22 is equal to or less than the threshold slip amount, the accelerator pedal amount is equal to or less than the threshold accelerator pedal amount, and the state in which the difference between the target engine RPM and the actual engine RPM is equal to or more than the threshold engine RPM is maintained for the threshold time or more, the transmission controller 70 may determine that the damper clutch 22 sticks.

As it is determined that the damper clutch 22 sticks, the hydraulic pressure controller 80 may control the hydraulic pressure of the solenoid valve at step S280, thereby fixing the sticking damper clutch 22. In this case, the hydraulic pressure controller 80 may repeatedly supply the hydraulic pressure through the solenoid valve by repeating a process of engaging and disengaging the solenoid valve at a preset duty by a preset number of times, in order to fix the sticking damper clutch 22.

Figure 6:
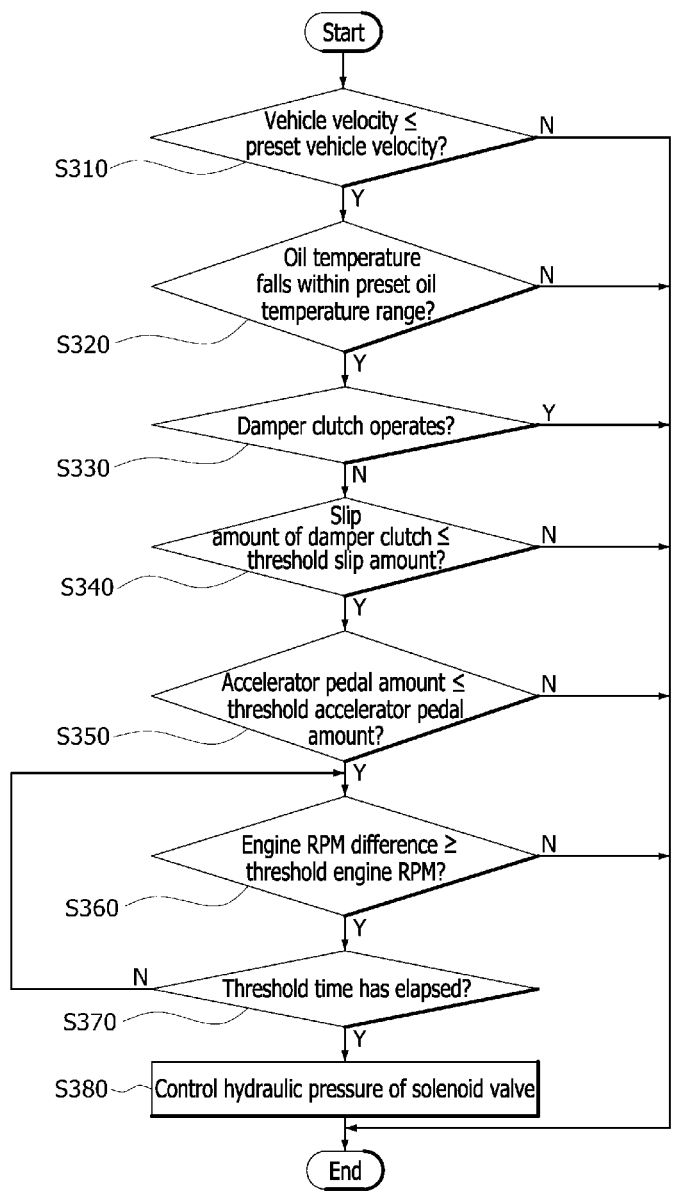
FIG. 6 is a flowchart illustrating a method for fixing a sticking damper clutch in accordance with still another embodiment of the present invention.

FIG. 6 is a flowchart illustrating a method for fixing a sticking damper clutch in accordance with still another embodiment of the present invention.

Referring to FIG. 6, the engine controller 30 may calculate a target engine RPM through an accelerator pedal amount of the accelerator pedal sensor depending on a driver's attention to accelerate the vehicle and information on whether the air conditioner is operated or the pressure of air flowing into the engine, detect a current engine RPM, and input the target engine RPM and the current engine RPM to the transmission controller 70.

The oil temperature sensor 50 may sense the temperature of oil within the automatic transmission, and input the sensed oil temperature to the transmission controller 70, the hydraulic pressure sensor 60 may sense hydraulic pressures introduced into the plurality of solenoid valves for controlling gear shifting of the automatic transmission, respectively, and input the sensed hydraulic pressures to the transmission controller 70, and the vehicle velocity sensor 40 may sense a vehicle velocity and input the sensed vehicle velocity to the transmission controller 70.

As the vehicle velocity is inputted from the vehicle velocity sensor 40, the transmission controller 70 may determine whether the vehicle velocity is equal to or less than a preset vehicle velocity, at step S310.

When the determination result of step S310 indicates that the vehicle velocity is equal to or less than the preset vehicle velocity, the transmission controller 70 may determine whether the damper clutch 22 actually sticks, based on one or more of an oil temperature sensed by the oil temperature sensor 50, information on whether the damper clutch 22 operates, a slip amount of the damper clutch 22, an accelerator pedal amount, and an engine RPM. The method in which the transmission controller 70 determines whether the damper clutch 22 sticks has been described above with reference to FIG. 4. Therefore, the detailed descriptions thereof are omitted herein.

That is, the transmission controller 70 may determine whether the oil temperature falls within the preset oil temperature range at step S320, determine whether the damper clutch 22 does not operate at step S330, determine whether the slip amount of the damper clutch 22 is equal to or less than a threshold slip amount at step S340, determine whether the accelerator pedal amount is equal to or less than a threshold accelerator pedal amount at step S350, and determine whether the state in which a difference between the actual engine RPM and the target engine RPM calculated through the information on whether the air conditioner is operated or the pressure of air flowing into the engine is equal to or more than a threshold engine RPM is maintained for a threshold time or more, at steps S360 and S370.

When the determination results indicate that the oil temperature falls within the preset oil temperature range, the damper clutch 22 does not operate, the slip amount of the damper clutch 22 is equal to or less than the threshold slip amount, the accelerator pedal amount is equal to or less than the threshold accelerator pedal amount, and the state in which the difference between the target engine RPM and the actual engine RPM is equal to or more than the threshold engine RPM is maintained for the threshold time or more, the transmission controller 70 may determine that the damper clutch 22 sticks.

As it is determined that the damper clutch 22 sticks, the hydraulic pressure controller 80 may control the hydraulic pressure of the solenoid valve at step S380, thereby fixing the sticking damper clutch 22. In this case, the hydraulic pressure controller 80 may repeatedly supply the hydraulic pressure through the solenoid valve by repeating a process of engaging and disengaging the solenoid valve at a preset duty by a preset number of times, in order to fix the sticking damper clutch 22.

In accordance with the embodiments of the present invention, the apparatus and method for fixing a sticking damper clutch may determine whether the damper clutch 22 within the torque converter 20 sticks, based on the information of the engine controller 30 and the damper clutch status, and fix the sticking damper clutch by controlling the solenoid valves according to the determination result.

The apparatus and method for fixing a sticking damper clutch can prevent an engine stop caused by the sticking damper clutch by fixing the sticking damper clutch within the torque converter 20, thereby inducing the vehicle to normally drive.

The apparatus and method for fixing a sticking damper clutch can prevent a reduction in launch feel, which may be caused by the sticking damper clutch, by fixing the sticking damper clutch, thereby increasing a passenger's satisfaction.

The apparatus and method for fixing a sticking damper clutch can determine whether the damper clutch 22 within the torque converter 20 sticks, based on the information of the engine controller 30 and the damper clutch status, without a separate device or equipment, thereby minimizing the number of parts and the cost which are required for determining whether the damper clutch 22 sticks.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for fixing a sticking damper clutch, comprising:
a transmission controller, the transmission controller determines whether a damper clutch sticks, using engine controller information received from an engine controller and damper clutch status information of the damper clutch,
wherein the transmission controller comprises a sticking determination unit and the sticking determination unit determines whether the damper clutch sticks, wherein the sticking determination unit determines whether a state in which a difference between an actual engine RPM and a target engine RPM calculated through information on whether an air conditioner is operated or the pressure of air flowing into an engine is equal to or more than a preset threshold engine RPM is maintained for a preset threshold time or more; and
a hydraulic pressure controller, the hydraulic pressure controller fixes the sticking damper clutch according to the determination result of the transmission controller.

2. The apparatus of claim 1, wherein the transmission controller further comprises:
a sticking occurrence environment condition determination unit, the sticking occurrence environment condition determination unit determines whether a preset sticking occurrence environment condition is satisfied, using gear shifting information or vehicle velocity sensed by a vehicle velocity sensor
wherein the sticking determination unit determines whether the damper clutch sticks, when the determination result of the sticking occurrence environment condition determination unit indicates that the sticking occurrence environment condition is satisfied.

3. The apparatus of claim 2, wherein when the gear shifting information indicates that gear shifting is not being performed or a speed stage is equal to or lower than a preset speed stage, or the vehicle velocity sensed by the vehicle velocity sensor is equal to or less than a preset vehicle velocity, the sticking occurrence environment condition determination unit determines that the sticking occurrence environment condition is satisfied.

4. The apparatus of claim 2, wherein the sticking determination unit determines whether the damper clutch sticks, based on at least one of an oil temperature, information on whether the damper clutch operates, a slip amount of the damper clutch, an accelerator pedal amount, and an engine RPM.

5. The apparatus of claim 4, wherein the sticking determination unit determines whether the damper clutch sticks, based on at least one of whether the oil temperature falls within a preset oil temperature range, whether the damper clutch does not operate, whether the slip amount of the damper clutch is equal to or less than a preset threshold slip amount, and whether the accelerator pedal amount is equal to or less than a preset threshold accelerator pedal amount.

6. The apparatus of claim 2, wherein when the determination result of the sticking determination unit indicates that the damper clutch sticks, the hydraulic pressure controller fixes the sticking damper clutch by controlling hydraulic pressure of a solenoid valve.

7. The apparatus of claim 6, wherein the hydraulic pressure controller repeats a process of engaging and disengaging the solenoid valve at a preset duty by a preset number of times.

8. A method for fixing a sticking damper clutch, comprising:
determining, by a transmission controller, whether a preset sticking occurrence environment condition is satisfied, based on gear shifting information and vehicle velocity sensed by a vehicle velocity sensor;
determining, by the transmission controller, whether a damper clutch sticks, depending on whether the sticking occurrence environment condition is satisfied, wherein the transmission controller determines whether a state in which a difference between an actual engine RPM and a target engine RPM calculated through information on whether an air conditioner is operated or the pressure of air flowing into an engine is equal to or more than a preset threshold engine RPM is maintained for a preset threshold time or more; and
fixing, by a hydraulic pressure controller, the sticking damper clutch according to the determination result of the transmission controller.

9. The method of claim 8, wherein in the determining of whether the sticking occurrence environment condition is satisfied,
the transmission controller determines that the sticking occurrence environment condition is satisfied, when the gear shifting information indicates that gear shifting is not being performed or a speed stage is equal to or lower than a preset speed stage, or the vehicle velocity sensed by the vehicle velocity sensor is equal to or less than a preset vehicle velocity.

10. The method of claim 8, wherein in the determining of whether the damper clutch sticks,
the transmission controller determines whether the damper clutch sticks, based on at least one of an oil temperature, information on whether the damper clutch operates, a slip amount of the damper clutch, an accelerator pedal amount, and an engine RPM.

11. The method of claim 10, wherein in the determining of whether the damper clutch sticks,
the transmission controller determines whether the damper clutch sticks, based on at least one of whether the oil temperature falls within a preset oil temperature range, whether the damper clutch does not operate, whether the slip amount of the damper clutch is equal to or less than a preset threshold slip amount, and whether the accelerator pedal amount is equal to or less than a preset threshold accelerator pedal amount.

12. The method of claim 8, wherein in the fixing of the sticking damper clutch,
the hydraulic pressure controller fixes the sticking damper clutch by controlling hydraulic pressure of a solenoid valve according to the determination result of a sticking determination unit of the transmission controller.

13. The method of claim 12, wherein in the fixing of the sticking damper clutch,
the hydraulic pressure controller repeats a process of engaging and disengaging the solenoid valve at a preset duty by a preset number of times.

14. A method for fixing a sticking damper clutch, comprising:
determining, by a transmission controller, whether oil temperature falls within a preset oil temperature range;

determining, by the transmission controller, whether a damper clutch operates, when the oil temperature falls within the oil temperature range;

determining, by the transmission controller, whether a slip amount of the damper clutch is equal to or less than a preset threshold slip amount, when the damper clutch does not operate;

determining, by the transmission controller, whether an accelerator pedal amount is equal to or more than a preset threshold accelerator pedal amount, when the slip amount of the damper clutch is equal to or less than the threshold slip amount;

determining, by the transmission controller, whether a state in which a difference between an actual engine RPM and a target engine RPM calculated through information on whether an air conditioner is operated or the pressure of air flowing into an engine is equal to or more than a preset threshold engine RPM is maintained for a preset threshold time or more, when the accelerator pedal amount is equal to or less than the threshold accelerator pedal amount; and determining, by the transmission controller, that the damper clutch sticks, when the state in which the difference between the actual engine RPM and the target engine RPM calculated through the information on whether the air conditioner is operated or the pressure of air flowing into the engine is equal to or more than the threshold engine RPM is maintained for the threshold time or more; and fixing, by a hydraulic pressure controller, the sticking damper clutch according to the determination result of the transmission controller.

15. The method of claim 14, further comprising determining, by the transmission controller, whether a preset sticking occurrence environment condition is satisfied, based on gear shifting information or vehicle velocity sensed by a vehicle velocity sensor.

16. The method of claim 15, wherein in the determining of whether the sticking occurrence environment condition is satisfied, the transmission controller determines that the sticking occurrence environment condition is satisfied, when the gear shifting information indicates that gear shifting is not being performed or a speed stage is equal to or lower than a preset speed stage, or the vehicle velocity sensed by the vehicle velocity sensor is equal to or less than a preset vehicle velocity.

* * * * *